Aug. 13, 1957  F. C. MIKLAS  2,802,921
CONTROL FOR ELECTRICALLY HEATED APPLIANCES
Filed April 27, 1956  2 Sheets-Sheet 1

Inventor:
Frank C. Miklas,
by Armand Cifelli
His Attorney.

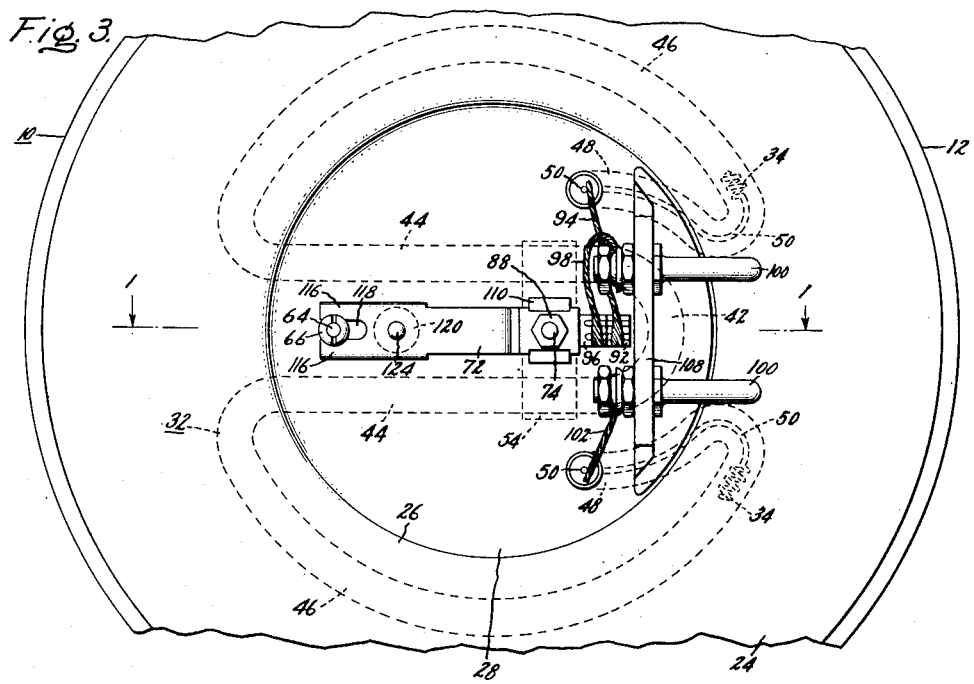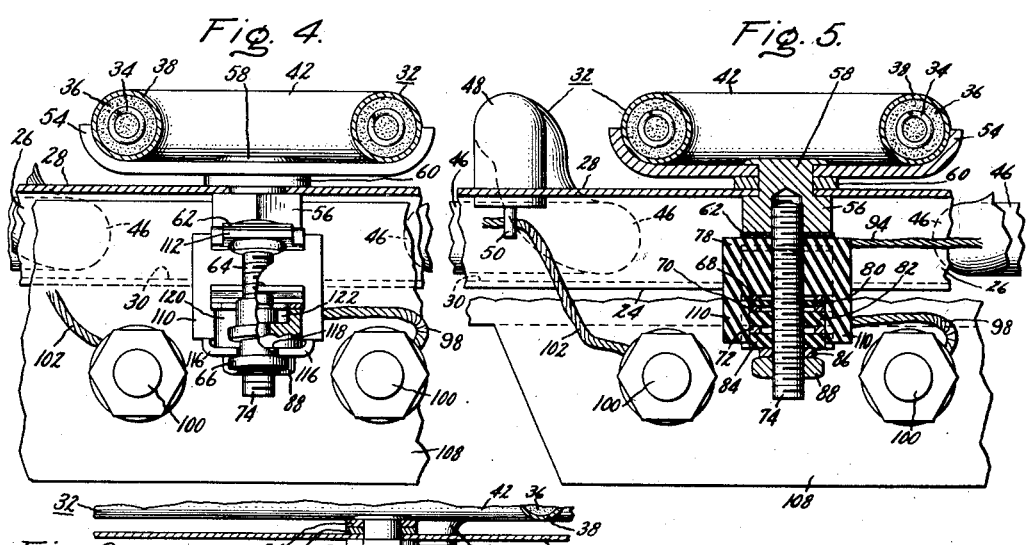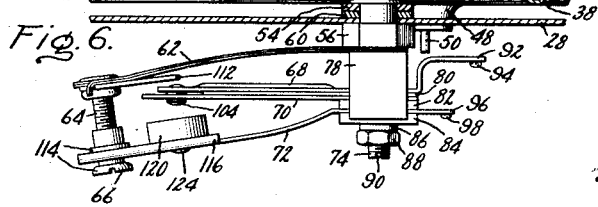

United States Patent Office 2,802,921
Patented Aug. 13, 1957

2,802,921
CONTROL FOR ELECTRICALLY HEATED APPLIANCES

Frank Carl Miklas, Allentown, Pa., assignor to General Electric Company, a corporation of New York Application April 27, 1956, Serial No. 581,140

12 Claims. (Cl. 200—138)

This invention relates to electrically-heated appliances and particularly to a control for governing the operation of such an appliance. The invention has many applications, but is well adapted for incorporation in an electric water kettle and, therefore, for the purposes of simplicity and clarity, will be disclosed as being incorporated in such a device.

Controls for electrically-heated appliances have received a considerable amount of attention from the art. In certain types of electrically-heated appliances, such as water kettles or vaporizers, it is desirable that the control terminate the supply of electricity to the heater in the appliance when substantially all of the liquid in the appliance has been used or vaporized. In such electrically-heated appliances, this type of control sometimes takes the form of a device which is referred to as an "over-temperature cutout"; the latter functions to break the electrical circuit and terminate supplying electricity to the heater in the appliance when the appliance reaches a predetermined temperature which is above its normal operating temperature and which is usually reached shortly after substantially all of the liquid in the appliance has vaporized. The importance of an over-temperature cutout from a safety point of view is great and believed to be obvious, for the danger of an appliance of the referred-to type which is not equipped with an over-temperature cutout can be readily visualized. Suffice to say that an electric water kettle or vaporizer that does not turn off its heater after all the liquid in it has been used is a serious fire hazard and generally dangerous.

Over-temperature cutouts have been provided by the prior art, however, they are subject to certain deficiencies. These devices usually fall into two general categories: (1) those which require manual resetting after once being actuated to break the circuit, and (2) those which will automatically cycle back on after breaking the circuit. The main drawback of the manual resetting type is inherent in its requiring the user to perform a manual act, i. e., reset a member, before the appliance will operate after once having broken the circuit. People find that they forget to reset the member, resulting often in their thinking that the appliance is not operating properly when it does not go on after having been cut out once, and then placed into use again without resetting. The main drawback of the cycling type is that it will cycle on and off around a predetermined temperature and a considerable amount of electricity is wasted due to the periodic energization of the heater when the control cycles back on. Furthermore, the predetermined temperature is usually rather high, therefore, the appliance remains very hot.

It is an object of the invention to provide an over-temperature cutout of the cycling variety, therefore, one which eliminates the need for a manual reset, which has a wide amplitude of temperature between its cutout temperature and its automatic resetting temperature, thereby reducing to a minimum the amount of time the heater is energized after the control has once cut out.

It is a further object of the invention to provide a temperature responsive control which is snap-acting and which lends itself to operation on either A. C. or D. C. current.

It is a further object of this invention to provide a low cost, compact, efficient control for an electrically-heated appliance, which is particularly well suited for use as an over-temperature cutout and which lends itself to easy calibration.

It is a still further object of this invention to provide an improved mounting for an over-temperature cutout in an electrically-heated appliance.

Some of the objects of this invention are achieved in one form by the provision in an electrically-heated appliance of a control having a pair of contact carrying blades, a keeper which has portions disposed between the contact blades, a magnet on one of the blades which cooperates with the keeper, and a thermal-responsive member which in response to a predetermined temperature increase cooperates with one of the blades to effect separation of the contact blades after overcoming the holding force created by the magnetic attraction of the keeper and the magnet.

Other objects are accomplished in one form by mounting an over-temperature cutout in an electrically-heated appliance in such a manner as to be thermally connected with a heating element which normally is immersed in and heats the liquid in the appliance, and which operates to transmit heat directly to the control upon having a portion of itself uncovered by the liquid.

Other objects and further details of that which I believe to be novel and my invention will be clear from the following description and claims taken with the accompanying drawings wherein:

Fig. 3 is a bottom plan view of the water kettle after the base has been removed.

Fig. 4 is a sectional view taken on line 4—4 of Fig. 1.

Fig. 5 is a sectional view taken on line 5—5 of Fig. 1.

Fig. 6 is a view similar to Fig. 2 on a reduced scale showing the control after its components have reacted to a temperature increase to separate the electrical contacts and open the circuit of which the control forms a part.

Figures 1, 2:
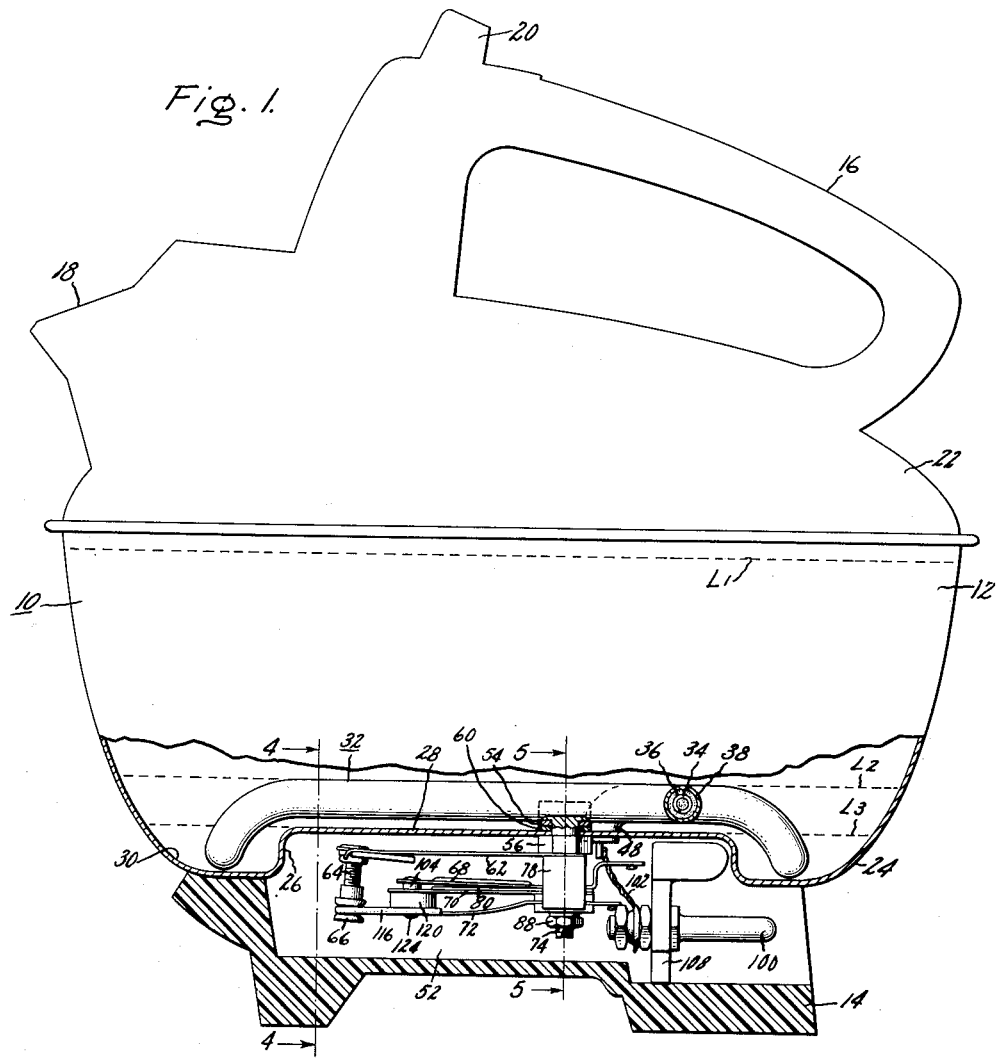
Fig. 1 is a side elevation view of a water kettle incorporating my invention and having portions broken away substantially on line 1—1 of Fig. 3 and shown in section.
Fig. 2 is an enlarged view of a portion of Fig. 1 having some additional parts broken away and shown in section.

Referring to Fig. 1 the water kettle is designated generally by the reference numeral 10 and comprises a liquid receptacle 12, the base 14, the handle 16, the spout 18 and a pushbutton 20 for controlling the operation of the cover which forms a part of the spout. The details of the handle, spout and pushbutton form no specific part of this invention and, therefore, will not be described in detail.

The receptacle 12 may comprise an upper shell 22 and a lower shell 24 joined together in any desired manner. The lower central portion of the shell 24 is dished upwardly to form a cylindrical, flange-like step 26 and a circular flat wall 28. The configuration of shell 24 results in the formation of a circular trough 30 within the receptacle around the step 26. The base 14 is removably secured to the shell 24 in any conventional manner, and when secured thereto it cooperates therewith to form a chamber 52.

Disposed in the receptacle is a bent, elongated, tubular heater 32 which is of the insulated sheathed type and comprises a central coil of heater wire 34 which is surrounded by an appropriate electrical insulating material 36 and sheathed in the metallic tube 38 (see Fig. 2). This type of heater is well known and readily available and, therefore, will not be described in further detail. The manner in which the heater 32 is bent may be seen in Figs. 1 and 3. In Fig. 3 it will be observed that the heater has a central U-shaped portion 42, each leg 44 of which merges into an arcuate side portion 46, the free ends of which are bent abruptly at 48 and pass through openings in wall 28. The portions of the heater around the free ends are rigidly secured to the wall 28 by soldering or the like. In Fig. 3 it will be observed that the heater wire coil 34 terminates near the ends of arcuate side portions 46 adjacent to the bent portions 48, and a single lead 50 extends from each end of the coil 34 and passes through the wall 28 into the chamber 52 formed between the shell 24 and the base 14.

It will be observed in Figs. 4 and 5 that the arcuate side portions 46 of the heater are disposed in the trough 30 and that the central U-shaped portion 42 is disposed at a slightly higher elevation and located above the surface 28. The heater in addition to being supported at its ends 48 which pass through the wall 28 is supported at its central U-shaped portion 42 by a copper clamp 54. The clamp may be brazed to the heater and is supported centrally by a copper post 56 which is predominently disposed in chamber 52, but which extends through the wall 28 into the receptacle. The upper end 58 of post 56 extends through an opening in the clamp 54 and is peened over to secure the post to the clamp. Between the clamp and wall 28, a washer-like thermal insulator 60 surrounds the post and spaces the clamp from the wall. The insulator 60, wall 28 and remainder of the shell 24 may be made of a relatively good heat insulator such as stainless steel. It will, therefore, be observed that because of the materials selected, a good thermal path is provided between the heater 32, the copper clamp 54, and the copper post 56.

The improved control is disposed within the chamber 52 and is completely supported by the post 56. It essentially comprises the following major components: the bimetal strip 62, the upper contact blade 68, the keeper 70, and the lower contact blade 72. The manner in which these components and their associated parts are assembled can best be seen in Fig. 2 wherein it will be observed that the bimetal strip, the upper and lower contact blades and the keeper are each supported at one of their ends on a threaded member 74 which is received in the threaded opening 76 in the post 56.

The control components and parts are mounted in sequence on the threaded member 74 in the following manner: The bimetal strip 62 is in direct contact with the lower surface of the post 56 and below the bimetal strip there is positioned a spacer 78 made of a good electrical and heat insulating material. Adjacent the lower surface of the spacer 78 is disposed the upper contact blade 68, next to which there is disposed a strip 80 which is made of a good electrical insulating material. Strip 80 extends along the keeper 70, which is disposed below and next to it. The keeper 70 is made of a ferromagnetic metal such as steel and is relatively rigid compared with the upper and lower contact blades, which are relatively flexible. Below the keeper 70 there is disposed a washer 82 made of a good electrical insulating material and next to the washer there is disposed the lower contact blade 72. There then follows the washer 84 made of a good electrical insulating material, the lock washer 86 and the retaining nut 88. A kerf 90 is provided in the free end of the threaded member 74 to provide for adjustment. The spacer 78 has a pair of depending side walls 110 which contact edge portions of the contact blades, keeper, and their associated parts to prevent rotation of these parts relative to the member 74 or each other (see Fig. 5). If desired, the side walls 110 may be dispensed with, and the parts retained in proper position by friction between them which is caused when they are assembled.

It should be observed that the mounting of the referred-to components and parts is such that the bimetal strip 62 is in good thermal communication with the post 56 and ultimately the heater 32, and that it is electrically insulated from the current carrying components of the control; namely, the blades 68 and 72. Further it should be recognized that due to the selection of materials, the members below the spacer 78 are thermally isolated from the post 56 to prevent the flow of heat to the current carrying members. Lastly, while the current carrying members are mounted on the threaded member 74, they are not in contact therewith and, therefore, are completely electrically isolated from all the remaining components and parts of the control.

The electrical wiring of the appliance will now be described with particular reference to Figs. 2 and 3. The upper contact blade 68 has an extension 92 which supports an electrical lead 94 which is connected to one of the heater leads 50 of the heater coil 34. The lower contact blade 72 has an extension 96 which supports an electrical lead 98 which is connected to one of the terminal prongs 100. The electrical lead 102 connects the other terminal prong 100 with the other heater lead 50. The terminal prongs 100 are carried by an insulating member 108 which floats, but is rigidly positioned when base 14 is secured to the shell 24. It will thus be seen that the wiring of the appliance is complete and that when a source of electricity is coupled to the terminal prongs 100, the circuit runs from one prong 100, through the lead 102, one of the heater leads 50, the coil 34, the other heater lead 50, the electrical lead 94, the extension 92 through the upper contact blade 68, the electrical contact 104 which is carried by the upper contact blade, through the electrical contact 106 which is carried by the lower contact blade 72 (when the contacts are in engagement), through the lower contact blade 72, the extension 96, the electrical lead 98 and out the other terminal prong 100. It will, therefore, be clear that when the electrical contacts 104 and 106 are in engagement, current flows through the heater 32 and the latter gets hot, and that when the electrical contacts are not in engagement, the circuit is broken and the heater is not energized.

Some of the details of the construction and assembly of the control will now be described. At its free end, the bimetal strip 62 supports the actuator stud 64. The upper end of the stud has a pair of shoulders which grip the end of the bimetal strip and an insulator strip 112. The latter prevents contact between the bimetal strip and the remainder of the control during operation of the control. The lower end of the actuator stud threadedly receives the actuator 66, which is made of an electrical insulating material and has a pair of spaced flanges 114 formed thereon. The actuator 66 is mounted on the stud 64 so as to be adjustable relative thereto and to remain in adjusted position during use. The lower contact blade 72 at its free end has oppositely extending edges 116 bent upwardly to lend rigidity to that portion of the blade (see Fig. 4), whereas the remainder of the blade is flexible. Blade 72 also has a slot 118 formed at its free end. The edge portions of the blade 72 contiguous with the slot are received between the flanges 114 of the actuator 66. The connection is such that relative movement of the free end of the blade 72 is permitted between the flanges of the actuator.

Intermediate its ends, the blade 72 supports a magnet 120. The magnet has a recess 122 which receives electrical contact 106, which has a rod-like extension 124 which passes through openings in the magnet and the lower contact blade, and has its free end peened over to thereby assemble the contact and magnet to the blade. It will be observed that the contact and magnet carried by the lower contact blade are carried at a point along the blade's length which is rendered rigid by the bent edges 116.

The general operation of the water kettle is as follows: the amount of water to be boiled is added to the receptacle and, let us assume, that it is filled to the level L1 in Fig. 1. A conventional source of electricity is attached to the terminal prongs 100 and the parts of the control are essentially as disposed in Fig. 1 and Fig. 2. In this condition, the contacts 104 and 106 are in engagement and the circuit is closed. The heater 32 is energized, and being immersed in the liquid, it will heat the liquid rapidly in a known manner. Eventually the temperature of the water will reach approximately 212° F. and an appropriate signal, such as a whistle, may be actuated to notify the user that the water is boiling. The user may then draw off as much boiling water as is desired.

During normal operation, the clamp 54, post 56 and bimetal strip 62 heat up to and are maintained substantially at 212° F.; at this temperature, the bimetal strip deflects slightly. The contacts remain in engagement and the heater continues to be energized, because the components of the control are designed to keep the circuit closed until approximately 225° F. is reached. Assume that the level of the water goes down to that indicated L2, the same conditions will obtain. However, upon further lowering of the level of the water, a portion of the central U-shaped bend of the heater will become exposed. When the level of the water goes below this portion of the heater, to, let us say, the level indicated L3, the central U-shaped portion of the heater will be fully exposed. When this condition obtains, and during lowering of the water from level L2 to L3, less heat is dissipated into the water and more heat will flow directly from this portion of the heater through the clamp 64 and post 56 to the bimetal strip 62 and heat the latter parts rapidly. It should be noted that because of the materials selected for these parts and for the wall 28 and insulator 60, the flow of heat will be directly to the bimetal strip 62, and relatively little will be lost through dissipation into the washer 60 or wall 28. Upon having its temperature increased, the bimetal strip, because its high expansion side is disposed on its upper side, will deflect further, and the free end of the bimetal strip will move the actuator downwardly.

In its initial condition, i. e., prior to using the appliance, the free end of the lower contact blade contacts the upper surface of the lower flange 114. After being placed is use, the bimetal strip heats up and deflects slightly as mentioned, and the lower surface of the upper flange 114 of the actuator moves toward the free end of the lower contact blade; after boiling temperature is reached, the upper flange 114 is nearly in contact with the free end of the lower contact blade. Upon further deflection of the bimetal strip 62, the upper flange 114 contacts the free end of the lower contact blade. The bimetal strip is then restrained from further deflection by the holding force between the magnet and the keeper. The restrained force and free deflection characteristics of the bimetal strip and the pull versus gap characteristic of the magnet are such that a substantial amount of travel occurs when the holding force between the magnet and the keeper at zero air gap is overcome upon a further increase in the temperature of the bimetal strip. This results in quick movement of the lower contact blade away from the keeper and quick separation of the contacts, thereby de-energizing the heater. Because the portion of the lower contact blade between the free end and the magnet is rigidified by the bent edges 116, little or no deflection occurs in said portion when the actuator moves the lower contact blade; all of the flexure occurs in the flexible portion of the lower contact blade. Due to the quick contact separation, or "snap-action," the control lends itself to use with either A. C. or D. C. current. There will then follow some thermal over-shoot, and the lower contact blade will be held away from the keeper by the actuator and the force of the deflected bimetal strip; this condition is shown in Fig. 6. As was previously mentioned, the control is designed in accordance with known principles so that the circuit is interrupted at approximately 225° F.

With the heater off, the appliance cools, and the bimetal strip starts to straighten out and return to its original flat shape. As this occurs, the upper surface of the lower flange 114 contacts the lower contact blade and moves it upwardly until the pull of the magnet abruptly moves the lower contact blade toward the keeper, resulting in engagement of the contacts. During movement of the lower contact blade, flexure occurs in the flexible portion of said blade. When the contacts are in engagement, the heater is again energized.

When the contacts are engaged, the magnet closely embraces the keeper, and the lower contact 106 forces the upper contact 104 upwardly slightly thereby deflecting the upper contact blade 68 slightly, and creating some contact pressure. Upon disengagement of the magnet from the keeper, the upper contact will follow the lower contact slightly before the lower contact is snapped away. This occurs when the upper contact blade contacts the insulator 80 and is restrained from further movement.

In view of the foregoing, it will be seen that a control has been provided which will cycle the heater "on" and "off." A feature is incorporated in the control to assist in achieving snap-action, and also to cause the control to cycle on a wide amplitude of temperatures, i. e., a wide differential of temperature between the temperature at which it cuts out (approximately 225° F.), and the temperature at which it cycles on. This feature comprises designing and mounting the lower contact blade in such a manner that it is deflected and, therefore, under stress whenever the magnet engages the keeper, and so that it is straight and floats freely and unstressed when the magnet is spaced from the keeper. This feature assists in achieving snap-action, because when the magnet contacts the keeper, the lower contact blade is deflected and exerts a separating force which assists the bimetal strip in separating the contacts. This feature produces the desired wide amplitude of cycling temperatures by resisting the straightening effect of the bimetal strip, which occurs upon cooling of the bimetal strip, after the contacts have once been separated. The latter obtains because the lower contact blade must be forcibly deflected before the magnet contacts the keeper.

In practice it was found that the control will not cycle back on until the temperature is reduced to 160° F. It was also found that a water kettle constructed as disclosed above may be allowed to boil dry, and because of the wide amplitude of temperature on which the control cycles, it is possible to have the kettle operating on the line continuously in a dry condition and yet the heater will be energized less than 30 seconds in a fifteen minute period.

It should be observed that because the control is one which will cycle back on after sufficient cooling, the necessity of a manual reset with all of its attendant inconveniences and deficiencies is eliminated. Notwithstanding its convenience, the control is extremely safe, due to the referred-to large temperature differential between the cutout temperature and the reset temperature. Whereas the control will cycle on and off, it will not cycle rapidly and consequently the heater will be energized only a small amount of time when the kettle is operating in a dry state and the kettle will not be maintained at a high temperature. Lastly, because the keeper is relatively rigid, and the upper blade's position at separation of the contacts is governed by the keeper, a substantially fixed point is established for the upper contact; this assists in calibration, which may be effected by adjusting the actuator 66 on the actuator stud 64.

As will be evident from the foregoing description, certain aspects of my invention are not limited to the particular details of construction of the example illustrated, and I contemplate that various and other modifications and applications will occur to those skilled in the art. It is, therefore, my intention that the appended claims shall cover such modifications and applications as do not depart from the true spirit and scope of my invention.

What I claim as new and desire to secure by Letters Patent of the United States is:

1. A control for an electrically-heated appliance comprising a heat conducting support, a temperature-responsive member secured to said support, a pair of spaced electrical contact carrying blades, a ferromagnetic metallic member between said blades, a magnet on one of said blades and adapted to normally contact said metallic member and urge the contacts into engagement, said temperature-responsive member adapted to deflect in response to an increase in temperature and force the magnet-carrying blade away from the other blade and ultimately overcome the holding force between the magnet and metallic member to quickly part the magnet and metallic member and disengage the contacts.

2. A device as defined in claim 1 wherein said magnet surrounds one of the contacts, said metallic member is apertured and the other contact is located in said aperture, whereby said magnet normally contacts the portions of said metallic member that surround said aperture and holds the contacts in engagement.

3. A device as defined in claim 1 wherein said temperature-responsive member supports an actuator having a pair of spaced flanges and said magnet-carrying blade has portions that are disposed between said flanges, whereby upon a predetermined increase in temperature and the resultant deflection of said temperature-responsive member, one of said flanges contacts said magnet-carrying blade's portions and moves said magnet-carrying blade to part the magnet and metallic member, and thereafter upon a predetermined decrease in temperature, said temperature-responsive member undeflects and the other flange contacts said magnet-carrying blade's portions and moves said magnet-carrying blade and said magnet toward the metallic member.

4. A device as defined in claim 1 wherein said magnet-carrying blade is stressed when the magnet is in contact with said metallic member, and the stress is substantially relieved when the magnet and metallic member are parted, and wherein upon a predetermined decrease in temperature after the magnet and metallic member have been parted, the temperature-responsive member undeflects and moves the magnet-carrying blade toward said metallic member against the opposition of said magnet-carrying blade, which must be stressed before said magnet will contact said metallic member.

5. A control for an electrically-heated appliance comprising a heat-conducting support, a temperature-responsive member secured at one of its ends to said support, a pair of flexible blades, a substantially non-flexible, ferromagnetic metallic member disposed between said blades, an aperture in said member, a first electrical contact on one of said blades disposed in part in said aperture, a second electrical contact on the other blade, a magnet on the other blade surrounding said second contact and disposed normally to contact and hold the portions of said metallic member that surround said aperture and thereby urge said second contact into engagement with said first contact, said temperature-responsive member in response to a predetermined increase in temperature adapted to force said other blade away from said metallic member to separate the magnet from the metallic member and quickly disengage the contacts.

6. A device as defined in claim 5 wherein said one blade is deflected slightly away from said metallic member when the contacts are engaged to thereby develop some contact pressure, whereby said one blade moves toward said metallic member until further movement is prevented by said metallic member when said magnet is forced away from said metallic member.

7. A device as defined in claim 5 wherein said temperature-responsive member supports at its other end actuating means including a pair of spaced flanges, and said other blade has portions that are disposed between said flanges, whereby one of said flanges contacts said other blade's portions on said increase in temperature to move said other blade away from said metallic member, and the other flange contacts said other blade's portions to move said other blade toward said metallic member upon a predetermined decrease in temperature.

8. A device as defined in claim 5 wherein said other blade is stressed when the magnet is in contact with said metallic member, and wherein upon parting of the magnet and metallic member, the stress is substantially relieved, and wherein upon a predetermined decrease in temperature after the magnet and metallic member have been parted, the temperature-responsive member moves said other blade toward said metallic member against the opposition of said other blade, which must be stressed before said magnet will contact said metallic member.

9. A device as defined in claim 5 wherein said flexible blades and said metallic member are supported by said support, but are thermally insulated therefrom.

10. A control for an electrically-heated appliance comprising a heat-conducting support, a temperature-responsive member secured at one of its ends to said support, a pair of spaced, generally parallel, flexible blades, a substantially non-flexible, ferromagnetic metallic member disposed between said blades, said blades and metallic member being supported at one of their respective ends by said support but being thermally isolated therefrom, said blades and metallic member being electrically isolated from each other at their supported ends, said metallic member having an aperture, one of said blades carrying an electrical contact that extends through said aperture, the other of said blades carrying a magnet and an electrical contact disposed concentrically within said magnet, said magnet being located on said other blade so as to normally closely embrace the portions of said metallic member that surround said aperture and thereby urge said electrical contacts into engagement and slightly deflect said one blade away from said metallic member, said other blade normally being stressed, an actuator carried by said temperature-responsive member and having a pair of spaced flanges, said other blade having portions disposed between said flanges, whereby upon a predetermined increase in temperature, said temperature-responsive member deflects and moves said actuator so as to cause one of said flanges to contact said other blade's portions to move said other blade away from said metallic member to separate the magnet from the metallic member and quickly disengage the electrical contacts, the separation being attended by a substantial reduction in the stress in said other blade and resulting in said other blade being held away from said metallic member by the force of the deflected temperature-responsive member acting through said one flange of said actuator, whereby upon a predetermined decrease in temperature the temperature-responsive member undeflects and moves the other flange into contact with said other blade portions to move said other blade toward said metallic member against the opposition of said other blade, which must be stressed before said magnet will contact said metallic member.

11. A device as defined in claim 1 wherein a heater is mounted in said appliance and said support is in direct thermal contact with said heater.

12. A device as defined in claim 1 wherein a heater is mounted in said appliance, said heater has a portion higher than the remainder thereof, and said support is in direct thermal contact with said portion.

References Cited in the file of this patent

UNITED STATES PATENTS

| 1,332,040 | Hengstenberg | Feb. 24, 1920 |
| 1,398,635 | Fogwell et al. | Nov. 29, 1921 |
| 1,798,854 | Satchwell | Mar. 31, 1931 |
| 1,975,464 | Juengst et al. | Oct. 2, 1934 |
| 2,378,772 | Hummel | June 19, 1945 |